March 26, 1963  A. P. SOUSA ET AL  3,082,675
AUTOMATIC COLOR FILM TRANSPARENCY PROCESSING MACHINE
Filed Jan. 6, 1960  7 Sheets-Sheet 1

Antonio P. Sousa
Manuel M. Brilhante
INVENTORS

Fig. 4

Antonio P. Sousa
Manuel M. Brilhante
INVENTORS

March 26, 1963 A. P. SOUSA ET AL 3,082,675
AUTOMATIC COLOR FILM TRANSPARENCY PROCESSING MACHINE
Filed Jan. 6, 1960 7 Sheets-Sheet 4

Antonio P. Sousa
Manuel M. Brilhante
INVENTORS

Antonio P. Sousa
Manuel M. Brilhante
INVENTORS

United States Patent Office
3,082,675
Patented Mar. 26, 1963

3,082,675
AUTOMATIC COLOR FILM TRANSPARENCY PROCESSING MACHINE
Antonio P. Sousa, 302 Hope St., Fall River, Mass., and Manuel M. Brilhante, Bracket Ave., North Tiverton, R.I.
Filed Jan. 6, 1960, Ser. No. 726
13 Claims. (Cl. 95—89)

This invention relates to automatic machines and more particularly to a machine for processing color film, color prints and color transparencies automatically and progressively through a series of liquid containing tanks wherein the several steps of the process take place.

An object of the invention is to provide a color film, print and transparency processing machine which may be built to meet the needs of small photo-finishing businesses. Yet, the operation and timing of the machine is uniform and accurately controlled so that a uniform, high quality output is capable of being achieved at all times.

A feature of the machine is that by the use of different types or styles of reels the machine may be made universal, it being pointed out that only the reel types or styles are changed, avoiding structural changes or modifications or adjustments in the machine itself, thereby making the machine far more useful and desirable for photo-finishing businesses.

The liquid baths used in the machine and the conditions of time and temperature are maintained in accordance with specifications of suppliers or manufacturers of the photofinishing chemicals. There is no deviation from the ordinary materials used in finishing color film, transparencies, etc. However, a machine in accordance with the invention makes the entire procedure for processing automatic and strictly controlled as to time and temperature at which the film or color prints or color transparencies are subjected to the liquid emergence.

Briefly, a machine constructed to exemplify the principles of the invention operates from power delivered from a fractional horse power electric motor. All of the functions of the machine obtain motive force from this single fractional horse power motor.

A group of tanks are carried suitably by a main frame of the machine, and there are a number of reel lift arms which are elevated, after loading, turned and lowered into a bath for a predetermined time; again elevated and held for a duration over the tank allowing drainage. At the end of the immersion procedure in one tank, the lift arms will have rotated 180° in a horizontal plane and will have placed the reel supporting rack on the next adjacent lift arm so that the reels are capable of undergoing the same operational procedure, but in the next adjacent tank. Consequently, the reels will travel from one tank to another, maintaining the proper time in each solution, and at the end of the sequence they are deposited on an unloading table for manual subsequent handling.

The structural organization of the machine capable of producing these movements allows the timing of a number of steps to be adjusted so that precise immersion times for the reels in the solution tanks, may be selected and held indefinitely.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

In the accompanying drawings there is an illustration of a machine 10 which is especially designed to process color film, color prints and color transparencies automatically and progressively through a series of tanks wherein the several steps of the process take place.

Figure 1:
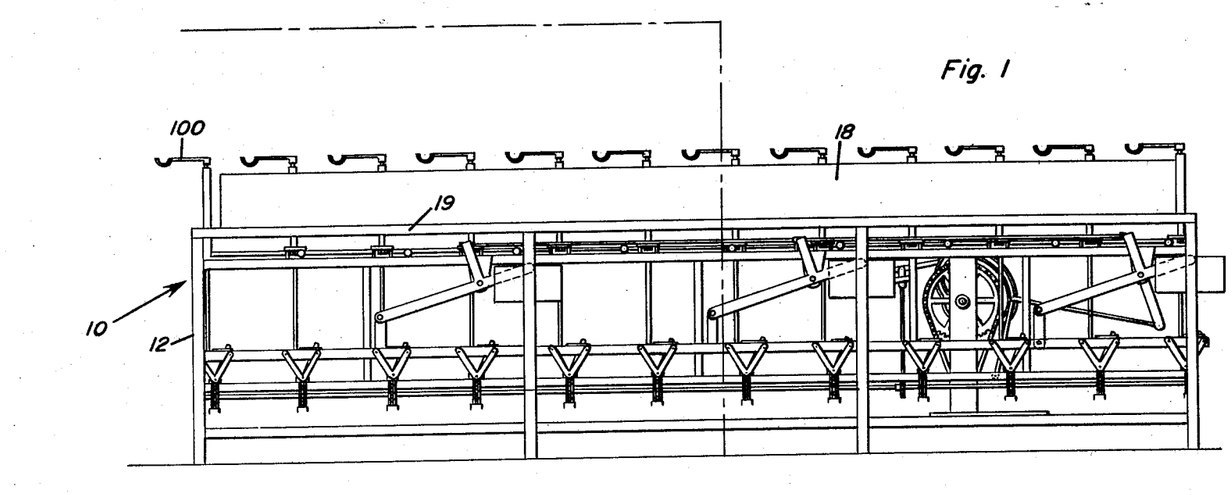
FIGURE 1 is a side elevational view of a machine exemplifying the invention.
Figure 2:
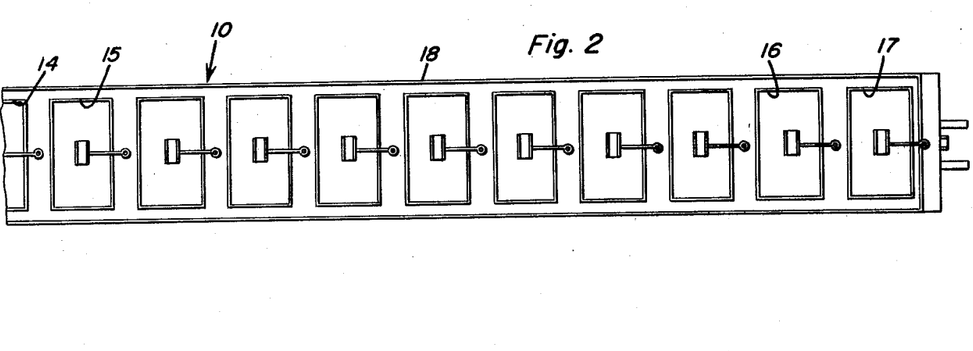
FIGURE 2 is a top view of the machine shown in FIGURE 1.

Referring first to FIGURE 1 and to FIGURE 2 it will be first recognized that there are a number of quite similar mechanisms from the left end of the machine to the right end. These will be described subsequently. Secondly, the machine 10 is made of a main frame 12, but this frame is merely a matter of structural supporting convenience and the design of the frame may be altered considerably. The third observation is that there are a number of tanks 14, 15, 16 and 17, these being only a few of the group of tanks. Each tank contains a liquid used in the chemical processing, and this liquid is absolutely conventional and unaltered by the invention. The tanks are disposed in an elongate receptacle 18 supported on the top 19 of frame 12. The receptacle contains water which is held to a proper temperature by standard heating and/or cooling devices and controls.

Figure 3:
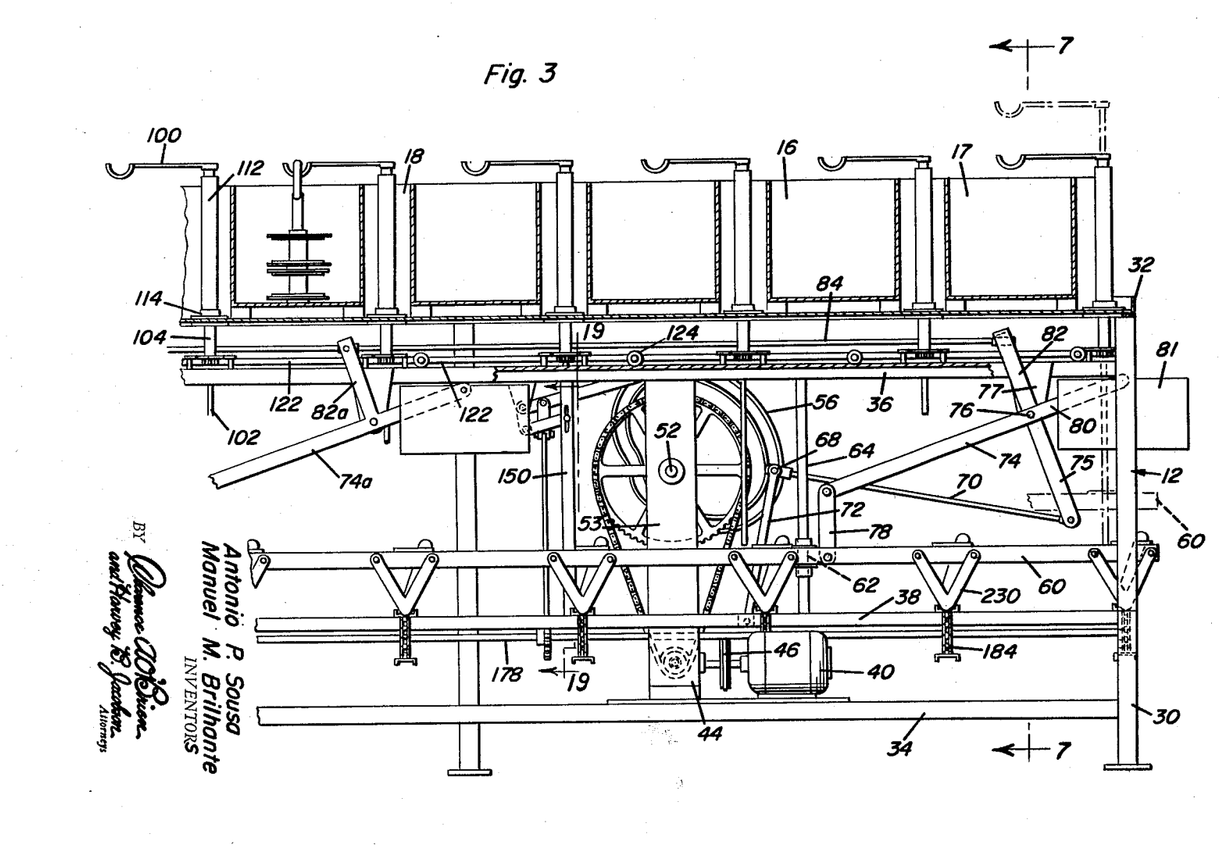
FIGURE 3 is a fragmentary enlarged side elevational view of a portion of the machine, parts broken away in section to illustrate otherwise obscure details.
Figure 7:
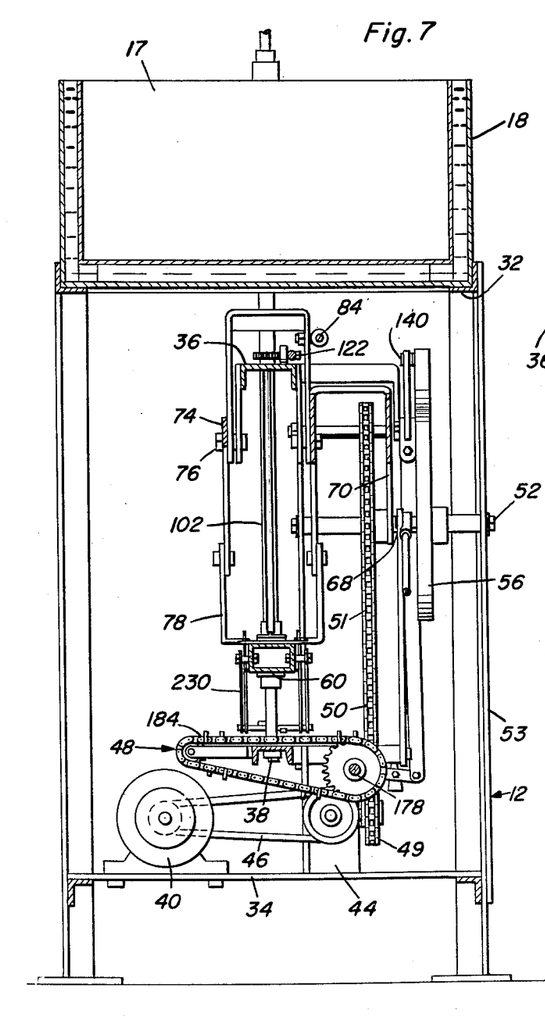
FIGURE 7 is a transverse sectional view taken on the 7—7 of FIGURE 3, but on slightly enlarged scale.

Reference is now made to FIGURE 3 and to FIGURE 7 for a better understanding of the frame 12. It has legs 30, an upper subframe 32 on which receptacle 18 is disposed, and a lower subframe 34 attached to the legs.

An upper intermediate frame member 36 is secured to the ends of the frame 12 and a lower intermediate frame member 38 is similarly secured with members 36 and 38 being fixed. The lower subframe 34 supports a fractional horse power motor 40 from which power is obtained to operate all moving parts of the machine. Motor 40 actuates a reducer 44 by way of a chain or belt drive 46 (FIGURE 7), and the output torque from speed reducer 44 is transferred by a chain and sprocket assembly 48 consisting of a small sprocket 49 secured to the reducer output shaft, a chain 50 engaged therewith and a large sprocket that is secured to shaft 52. The shaft is supported by means of a bearing and support 53 attached to the upper and lower subframes 32 and 34 (FIGURE 7).

A main cam 56 is attached to shaft 52 and rotates at a speed proportional to the speed of the sprocket 49. The cam has a shape made such as to cause various mechanical movements to take place in timed relationship with each other. In one typical machine, the cam turns at a rate of four revolutions per minute, and the description of machine 10 made herein is on this basis.

Figure 10:
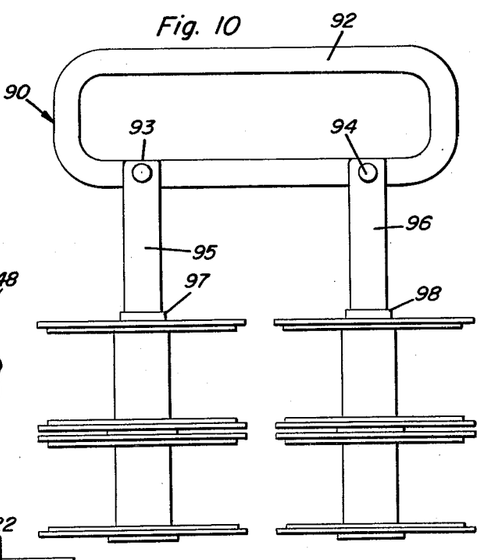
FIGURE 10 is an elevational view of a reel supporting rack used in the machine.
Figure 11:
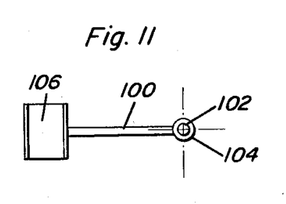
FIGURES 11 and 12 are top and side diagrammatic views, respectively, showing a reel lift arm and a reel lift rod traveling upward, this condition taking place during the first quarter of a revolution of the main cam in the machine.
Figure 12:
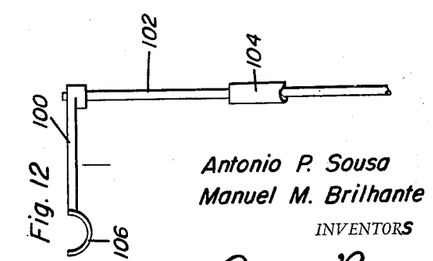
Figure 13:
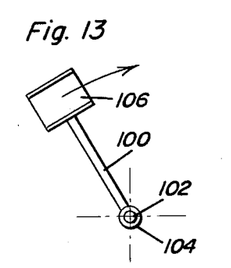
FIGURES 13 and 14 show the reel lift arm and rod in its proper relationship at the second quarter of a single revolution of the cam of the machine.
Figure 14:
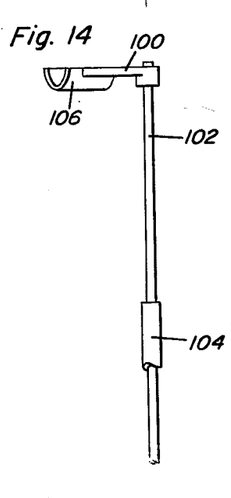
Figure 15:
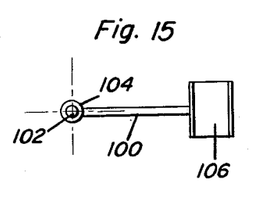
FIGURES 15 and 16 are diagrammatic views showing the arm and rod during the third quarter of a revolution of the cam.
Figure 16:
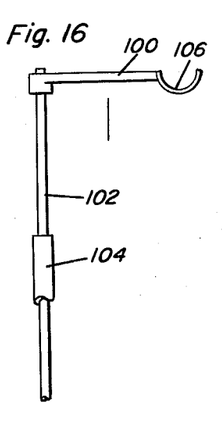
Figure 17:
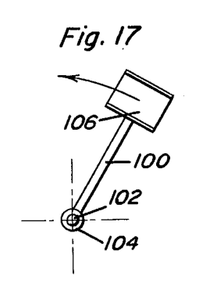
FIGURES 17 and 18 are diagrammatic top and elevational views showing the arm and rod during the fourth quarter of a revolution of the cam, the direction arrows and motion condition expressions identifying the movements necessary to lift (FIGURES 11 and 12), swing (FIGURES 13 and 14), lower (FIGURES 15 and 16), and transfer (FIGURES 17 and 18) a rack such as shown in FIGURE 10 so that it may be immersed in a solution tank and picked up by the next adjacent reel lift arm for subsequent immersion in the next tank with the process continuing until all tanks that are filled with liquid have been used.
Figure 18:
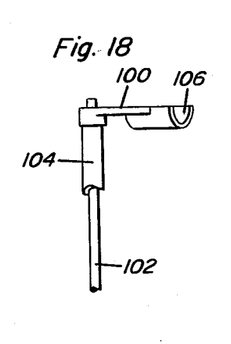

A vertically movable rail 60 extends lengthwise of frame 12 and has a number of openings 62 therein through which stationary guides 64 extend. The upper and lower ends of the guides are secured to frame members 36 and 38 (FIGURE 3), and they constrain movement of rail 60 to vertical motion. As cam 56 rotates, cam follower 68 which is engaged with the cam, causes an adjustable rail drive link 70 to be reciprocated. The rail drive link 70 is made adjustable as to length, for instance, by having threaded end sections thereon. Rail pivot arm 72 is pivoted to link 70 at cam follower 68 and pivoted to the fixed frame member 38. Rail lift arm 74 which is in cruciform shape, has one section 75 pivoted to link 70 and an intermediate part pivoted to pin 76 that is carried by a bracket 77 which depends from frame member 36. Rail lift link 78 is pivoted to the cruciform arm 74 and pivoted to the rail 60. Section 80 of rail lift arm 74 serves the purpose of supporting the pivoted counterweight 81, while section 82 of arm 75 is pivotally connected to tie rod 84 extending lengthwise of frame 12 and used for timing and drive purposes. FIGURE 3 shows rail lift arm 74a which is the same as rail lift arm 74, except that it is not equipped with a link such as link 70 in that it is not directly driven by the cam 56. Instead, tie rod 84 which is pivoted to section 82a of arm 74a, drives the lift arm 74a. Further, FIGURE 7 discloses the fact that the cruciform arm 74 and all its sections, and all parts conected with it except link 70, are duplicated, and the purpose is strength and rigidity of construction in this portion of the operating mechanism of machine 10. Inasmuch as the operation of machine 10 is given as the description of sections of the machine progress, the assembly at this point would indicate that the electric motor 40 rotates cam 56 at a predetermined speed through the chain and sprocket assembly 48. Cruciform arms 74, 74a and all those like it, are rocked in unison, and the motion is transmitted to lifting and lowering movement of rail 60. FIGURE 10 shows rack 90 made of an elongate handle 92 having removable pins 93 and 94 at the lower side thereof. The pins support reel spindles 95 and 96 on which reels are disposed. Weights 97 and 98 assure that the rack will remain in a generally vertical position during all phases of movement thereof. A rack such as this has the film supported thereon for machine handling.

Figure 9:
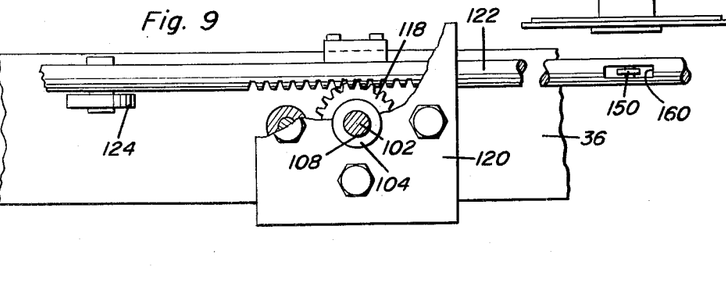
FIGURE 9 is a plan view with parts broken away in section and showing a portion of the means for rotating one of the reel lift arms.

Each of the chemical tanks has a rack lift arm 100 mounted alongside of it, and there is one lift arm actuating rod 102 connected with each lift arm 100. All arms and rods are identical, and each has a bearing tube 104 through which the actuating rod 102 extends. The outer extremity of lift arm 100 has an upwardly opening hook 106 which is engageable with the handle 92 of support rack 90 and to allow it to be transferred to the successive lift arms in the line of lift arms (FIGURE 1) for processing in the progressive tanks, such as tanks 14, 15, etc. The typical rod 102 (FIGURE 9) is equipped with a key and keyway connection at 108 (not shown) drivingly connecting it with tube 104 so that when the tube 104 is rotated, the rod 102 and hence arm 100 is also rotated. Yet, because of the key and keyway connection at 108, the lift rod 102 is capable of being elevated and lowered with respect to tube 104. This is how the various positions shown in FIGURES 11–18 are permitted.

Since tube 104 and rod 102 must extend through the water container 18, sleeve 112 extends through a lower seal 114 in the bottom of the receptacle 18 (FIGURE 3) to prevent water leakage. The tube 104 and rod 102 are concentrically arranged and extend through sleeve 112.

Figure 4:
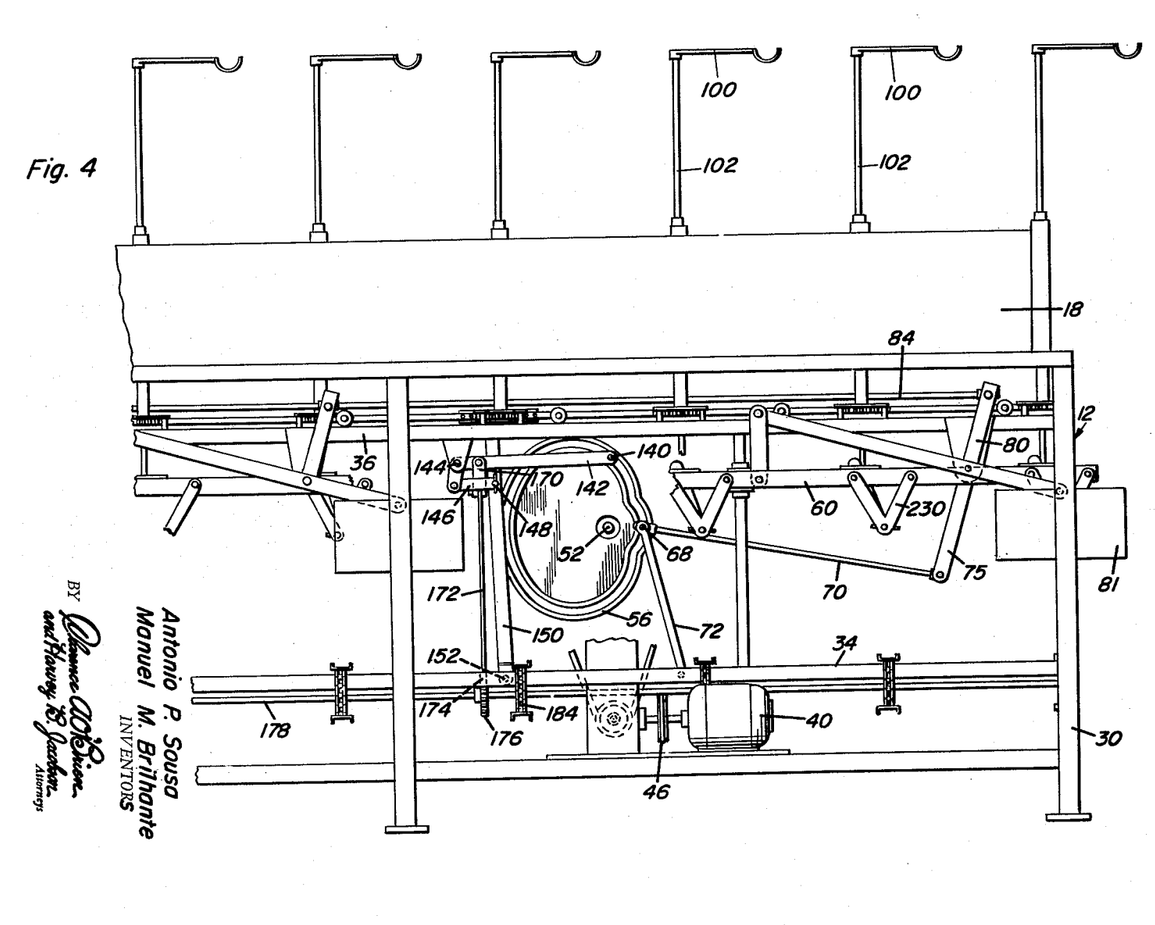
FIGURE 4 is a side elevational view similar to FIGURE 3 but having other parts broken away to illustrate different details of construction.
Figure 5:
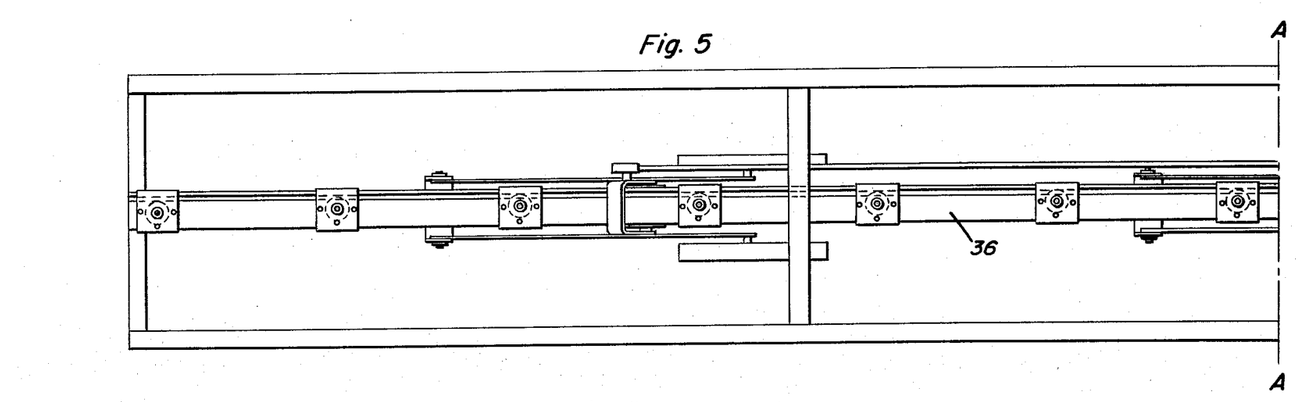
FIGURE 5 is a fragmentary top view of the machine with the lift arms and tanks removed.
Figure 6:
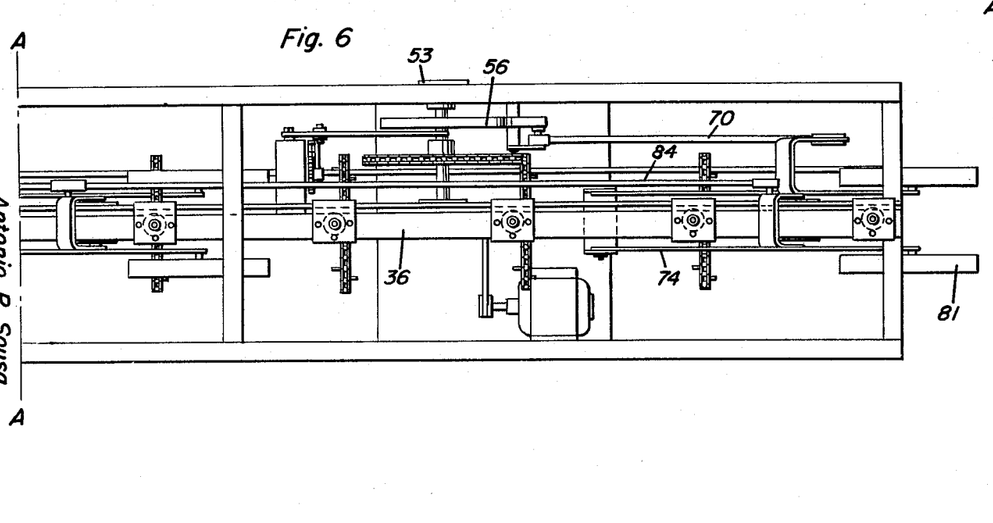
FIGURE 6 is a fragmentary top view similar to FIGURE 5 and when considered along matching lines A—A, forms a composite view of the machine.

Sleeve 104 is rotated by having a pinion 118 secured to the lower part thereof beneath plate 120 that is bolted or otherwise secured to frame member 36. A rack gear 122 is engaged with pinion 118, and has roller bearings 124 mounted on frame member 36 to allow the rack gear to reciprocate freely. As is evident from FIGURE 3, the rack gear 122 services all of the tubes 104 simultaneously. Comparison of FIGURES 11, 13, 15 and 17 will show that the arm 100 oscillates horizontally, and this mechanical movement is attributable to reciprocation of rack gear 122, but in timed sequence with cam 56. Rack gear 122 is reciprocated by a mechanical drive line extending from cam follower 140 engaged with cam 56 (FIGURE 4). Cam follower 140 is at one end of a rack drive crank 142 pivoted on pin 144 intermediate the ends of the crank, and the pin is supported on a bracket carried by frame member 36. Adjustable link 146 is pivoted to the end of crank 142 and connected by a pin and slot 148 to rack pusher arm 150 pivoted by pin 152 to lower frame member 34 and engaged in the slot 160 (FIGURES 3 and 9) in rack gear 122, the slot engaging end of the rack pusher arm 150 being at the top thereof.

Figure 8:
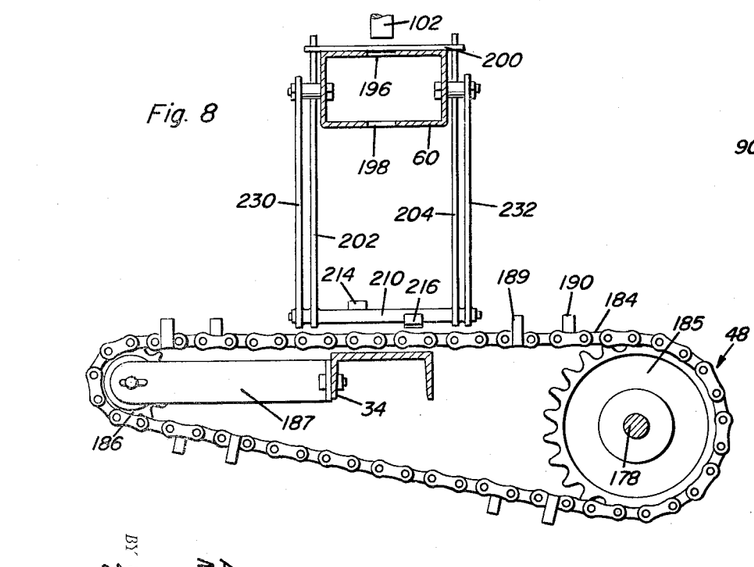
FIGURE 8 is an enlarged sectional view showing a timing mechanism constituting part of the machine.
Figure 19:
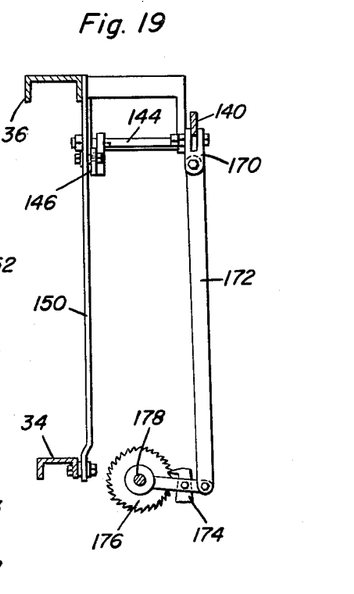
FIGURE 19 is a sectional view taken on the line 19—19 of FIGURE 3.

A ratchet drive link 170 (FIGURES 4 and 19) is pivoted to crank 142 and has a ratchet drive arm 172 pivoted thereto. The lower end of the ratchet drive arm has a pawl 174 connected thereto, and this is engagement with a ratchet wheel 176. The ratchet wheel is secured to shaft 178 so that shaft 178 may be ratchet driven in timed sequence with the rotation of cam 56. A number of timing chains 184 are driven by the ratchet actuated shaft 178. There is one timing chain for each lift arm 100 and lift rod 102, and one timing chain is shown in detail in FIGURE 8. It is engaged with a sprocket 185 attached to shaft 178 and it is also engaged with an adjustably mounted sprocket 186 carried by a bracket 187 which is secured to frame member 34. The chain 184 has a number of pairs of dogs, each pair consisting of dogs 189 and 190. The positioning of dogs 189 and 190 ultimately determines the time that the reels remain in the solution of the tanks. The reason is that lift rod 102 (FIGURE 8) can move through aligned openings 196 and 198 in rail 60 or these openings are blocked by sliding plate 200 disposed on the top of rail 60. Actuating arms 202 and 204 for the sliding plate 200 extend through slots in the edges of the sliding plate and are secured to spindle 210. The spindle has a pair of dogs 214 and 216 protruding from opposite side thereof and it will be noted from FIGURE 8 that the dogs 189 and 190 of each pair are on opposite sides of the chain 184. Hanger brackets 230 and 232, there being two on each side of rail 60, furnish bearing support for spindle 210 on rail 60. Preferably, the outer or free ends of the dogs 214 and 216 are beveled so as to form cam surfaces converging towards the spindle 210. Thus, as the dogs 189 or 190 strike the ends of the dogs 214 or 216, arms 202 and 204 are oscillated about their pivot connections to rail 60, and plate 200 is reciprocated so as to cover or uncover apertures 196 and 198. It is now seen that the blocking or opening of the apertures 196, 198 is obtained in timed sequence with the other moving parts of the machine, but the motion is ultimately traceable to cam 56. Summarizing this phase of the mechanical operation, as rail 60 is raised, the lift rods 102 are either contacted and vertically raised, or allowed to pass through the aligned openings 196 and 198 depending on whether plate 200 covers or exposes these openings. This, in turn, is the function of the setting of dogs 189, 190 (FIGURE 8). Meanwhile, the rotational movement of the arms 100 is independent of whether or not the rods are being raised or lowered vertically. As long as the hole 196 remains uncovered by plate 200, the rail 60 will merely move up and down with rod 102 sliding in holes 196 and 198. When the rail 60 is going through its up and down cycle, the arm 100 and rod 102 will rotate, but rack 90 will not be moved since the hook 106 will merely oscillate in and out of the rectangular slot in the rack. Thus by proper spacing of dogs 189 and 190, the rod 102 may be made to skip as many up and down cycles of rail 60 as desired. Therefore, by the particular setting of dog 189, 190 not only may the duration of the lowered position of the arms 100 be governed thereby resulting in the time that the rack 90 will remain in the solution, but the different lift rods 102 and arms 100 may be made to be in different stages of procedure along the length of the machine.

For final summary based on a machine having cam 56 rotating at 4 r.p.m., as the cam turns the first quarter revolution the rail drive link 78 moves the rail upward, and the lift rods 102 and spool rack 90 are raised vertically one foot, since it is assumed that the sliding plate 200 (FIGURE 8) covers opening 196. At the top of the second quarter revolution the lift rod 102 is vertically stationary while rotating clockwise (FIGURES 13 and 14) at the top of its stroke. The third quarter of a revolution has the lift rods and spool rack returning down to the bottom of the stroke (FIGURE 16), and the final quarter revolution has the rods vertically stationary. At the same time the rack gear 122 moves in a direction to turn the lift arm 180 degrees counterclockwise the lift rod is at the bottom of its stroke. The third quarter of a revolution of the cam has an arm 100 stopped insofar as rotational movement of the arm is concerned (FIGURE 15). Then the lift rod will turn 180 degrees counterclockwise (FIGURE 17) without rack 90 when the lift rod is at the bottom of its stroke so that the rack 90 previously carried thereby, will remain in the position deposited by hook 16 in the FIGURE 16 position.

To illustrate more specifically how the film spools carried on each rack 90 are transferred from tank to tank, reference is made to FIGURES 2 and 10 through 18. For example, assume a rack 90 loaded with spools in tank 14 with the rack setting or supported on the bottom of the tank, and the hook 106 supported on the right edge of the tank is at the bottom of its vertical stroke with this hook 106 spaced about three-quarters of an inch below the top bar of handle 92 as illustrated in FIGURE 1. During the first quarter cycle, the hook 106 with its arm 100 and rod 102 rises vertically about one foot so as to take up the three-quarter inch clearance and raise the rack about one foot (FIGURES 11 and 12) and during the second quarter of the cycle (FIGURES 13 and 14), the arm 100 with rack 90 rotates clockwise 180° in its elevated position so as to carry the rack over the edge of tank 15. During the third quarter of the cycle, the hook 106 and its rod 102 moves vertically downward but does not rotate (FIGURES 15 and 16) so as to set the rack 90 on the floor of the tank 15. The hook 106 and its rod 102 then continue downward about one-half inch until the hook is substantially centered in the slot of the rack. During the last fourth of the cycle, the hook 106 merely rotates 180° counter-clockwise in its lowered position so as to return to its original position. The length of the slot in handle 92 is sufficient to permit hook 106 to rotate in and out without striking the sides thereof. After the rack 90 and its spools have been immersed in the tank 15 a predetermined time, the hook supported on the right side of the tank 15 goes through the same cycle as explained above so as to deposit the rack and its spools in the tank to the right of tank 15. The cycles are repeated over and over until the spools are removed from tank 17 and deposited automatically on a support (not shown) exterior and to the right of tank 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic photographic processing machine comprising a frame, a plurality of tanks carried by said frame and arranged in line, a lift rod and arm mounted for use with each pair of adjacent ends of the tanks, there being one lift rod and arm for each tank, a tube concentric with said rod and mechanically supported for rotational movement on said frame, means drivingly connecting the tube with said rod for rotational movement through an arc of at least 180° and allowing axial movement of said rod with reference to said tube, a movable member carried by said frame and connecting means on the member engageable with the rods to elevate said rods, said connecting means connected with said movable member for selectively establishing a drive connection between said rods and said member and for permitting relative movement between said member and said rods, and means timed mechanically with the movement of said movable member for rotating said tubes and rods thereby rotationally displacing said arms so that said arms are raised and lowered with reference to said tanks and also rotationally moved to positions over adjacent tanks, the distance between each pair of adjacent rods being less than twice the length of each of said arms whereby the paths of movement of said adjacent arms may overlap so as to directly transfer film from one arm to an adjacent arm.

2. The subject matter of claim 1 wherein said means mechanically causing and synchronizing the movements of said member and said tubes include a single main cam, mechanical movement mechanisms connected to said can and driven by said cam and operatively connected respectively with the tube rotating means and said movable member.

3. The subject matter of claim 1 wherein said movable member consists of an elongate rail, means constraining the rail to vertical motion with reference to said frame.

4. In a machine to process color film, color prints and color transparencies automatically and progressively through a series of tanks, a frame supporting the tanks, a plurality of separate lift rod and arm assemblies wherein each assembly has a lift rod and an arm secured thereto, means for separably securing a rack to said arm so that the rack may be deposited in adjacent receptacles by said arm and released for engagement with a next adjacent arm, each assembly further including a tube which is drivingly connected with the rod for rotational movement only while said rod is longitudinally movable independent of the tube, and mechanical means drivingly connected with said rod and said tube of each assembly for reciprocating and rotating said rods respectively in timed sequence, the distance between each pair of adjacent rods being less than twice the length of each of said arms whereby the paths of movement of said adjacent arms may overlap so as to directly transfer film from one arm to an adjacent arm.

5. In a machine to process color film, color prints and color transparencies automatically and progressively through a series of tanks, a frame supporting the tanks, a plurality of separate lift rod and arm assemblies wherein each assembly has a lift rod and an arm secured thereto, means for separably securing a rack to said arm so that the rack may be deposited in adjacent receptacles by said arm and released for engagement with a next adjacent arm, each assembly further including a tube, means preventing axial movement of each tube relative to the frame, said tube drivingly connected with the rod for rotational movement only while said rod is longitudinally movable independent of the tube, and mechanical means drivingly connected with said rod and said tube of each assembly for reciprocating and rotating said rod and tube respectively in timed sequence, the distance between each pair of adjacent rods being less than twice the length of each of said arms whereby the paths of movement of said adjacent arms may overlap so as to directly transfer film from one arm to an adjacent arm, said mechanical means including a single cam, an elongated horizontal rail carried by said frame, a mechanical movement structure connected between said cam and rail to reciprocate said rail vertically, and control means connected with said rail and engaged by said rods for elevating said rods in response to movement of said rail.

6. The combination of claim 5 wherein the means on the rail engaged by the rods include abutment members slidably connected to said rail so as to move in covering and uncovering relationship to holes formed in the rail in axial alignment with said rods, and means for actuating said abutment members.

7. The subject matter of claim 6 wherein said means for actuating said abutment members are adjustable to predetermine the duration at which the rods and arms will remain in a lowered position with the consequence that the duration for submersion in the tanks is selectible, said abutments comprising plates pivoted by arms to said frame, and said abutment actuating means comprising an endless chain having means thereon engageable with means on the arms to pivot same.

8. A processing machine comprising a frame, a plurality of liquid tanks, a lift and transfer assembly located adjacent each of said tanks and carried by said frame and adapted to lower, lift and transfer a film container from one tank to the adjacent tank from which it is adapted to be recovered by an adjacent assembly, each assembly including a lift rod, means for elevating said lift rod, said elevating means connected with said frame, means ultimately carried by said frame for rotating said lift rod independent of the elevation thereof but in timed sequence therewith, a container support projecting from each rod and secured thereto, each of the supports defining arcuate paths in operation, the paths of adjacent supports overlapping one another.

9. In a photographic processing machine, a frame, a plurality of liquid tanks, a lift and transfer assembly located for operation between a pair of said tanks and carried by said frame and adapted to lower, lift and transfer film from one tank to the adjacent tank from which it is adapted to be recovered by an adjacent assembly, each assembly including a lift rod, means for elevating said lift rod, said elevating means connected with said frame, means ultimately carried by said frame for rotating said lift rod independent of the elevation thereof but in timed sequence therewith, a single drive means connected with said elevating and rotating means for said lift rod and carried by said frame, said drive means including an elongated vertically movable member carried by said frame and extending adjacent each of said rods, means carried by said movable member for selective engagement with all of said lift rods to elevate said lift rods.

10. In a photographic processing machine, a frame, a plurality of liquid tanks, a lift and transfer assembly located for operation between a pair of said tanks and carried by said frame and adapted to lower, lift and transfer film from one tank to the adjacent tank from which it is adapted to be recovered by an adjacent assembly, each assembly including a lift rod, means for elevating said lift rod, said elevating means connected with said frame, means ultimately carried by said frame for rotating said lift rod independent of the elevation thereof but in timed sequence therewith, a single drive means connected with said elevating and rotating means for said lift rod and carried by said frame, said drive means including an elongated vertically movable member carried by said frame, means carried by said movable member for selective engagement with all of said lift rods to elevate said lift rods, said rod rotating means including tubes drivingly connected with said rods for rotational movement, means preventing axial movement of said tubes, and means for rotating said tubes and rods synchronously with the movement of said movable member.

11. The subject matter of claim 10 wherein said drive means comprises a single cam carried by said frame, a motor, means drivingly connecting the single cam with said motor for operation of the single cam in response to energization of said motor, and said single cam ultimately driving said tube rotating means and said movable member.

12. A processing machine comprising a support, a plurality of liquid containers arranged in a line, a lift and conveying assembly located adjacent each of said containers and carried by said support, each assembly including a lift rod having a lift member for supporting a workpiece projecting radially from its upper end, the rods being spaced apart a distance less than twice the length of said members whereby the arcuate paths defined by the movement of the ends of the members overlap so that the workpiece may be conveyed directly by one member to an adjacent member and from one container to an adjacent container by the members only, and means connected with said members so as to oscillate and reciprocate the members in timed sequence.

13. A device as defined in claim 1 wherein one of the lift arms is fixed to each of the rods.

References Cited in the file of this patent

UNITED STATES PATENTS

| | | |
|---|---|---|
| 1,382,144 | Taylor | June 21, 1921 |
| 1,593,825 | Higgins | July 27, 1926 |